Sept. 15, 1931. J. R. REPLOGLE 1,823,124
REFRIGERATING UNIT
Original Filed June 6, 1921 6 Sheets-Sheet 1

FIG. 1.

PROPRIETOR.
John R. Replogle
BY
Hart & Lind
ATTORNEYS.

Sept. 15, 1931. J. R. REPLOGLE 1,823,124
REFRIGERATING UNIT
Original Filed June 6, 1921  6 Sheets-Sheet 2

Fig. 2.

INVENTOR.
John R. Replogle
BY
Hart & Lind
ATTORNEYS.

Sept. 15, 1931.  J. R. REPLOGLE  1,823,124
REFRIGERATING UNIT
Original Filed June 6, 1921   6 Sheets-Sheet 4

Fig. 4.

INVENTOR.
BY John R. Replogle
Hart & Sind
ATTORNEYS.

Sept. 15, 1931. J. R. REPLOGLE 1,823,124
REFRIGERATING UNIT
Original Filed June 6, 1921   6 Sheets-Sheet 6

INVENTOR.
John R. Replogle
BY
Hart & Lind
ATTORNEYS.

Patented Sept. 15, 1931

1,823,124

UNITED STATES PATENT OFFICE

JOHN R. REPLOGLE, OF DETROIT, MICHIGAN, ASSIGNOR, BY MESNE ASSIGNMENTS, TO KELVINATOR CORPORATION, OF DETROIT, MICHIGAN, A CORPORATION OF MICHIGAN

REFRIGERATING UNIT

Original application filed June 6, 1921, Serial No. 475.344, and in Canada February 11, 1922. Divided and this application filed October 10, 1927. Serial No. 225,273.

This invention relates to refrigerating or cooling devices that are automatically operated and controlled, the present application being a division of my co-pending application Serial No. 475,344 filed June 6, 1921.

One of the objects of this invention is the production of a new and improved, compact, portable refrigerating or cooling unit that is adapted to be installed, as a unitary structure, in enclosed spaces where it is desirable to maintain a comparatively cool temperature, such as in refrigerators, cooling rooms, and the like.

Another object of my invention is the provision of a highly compact motor compressor-condenser unit for refrigeration apparatus.

A further object of my invention consists in providing a unitary refrigerating apparatus which is adapted to be installed within and removed from a refrigerator, or other space, with a minimum of effort.

Other objects of this invention, some of them more or less ancillary or incidental to those above stated, will appear hereinafter as the description proceeds.

For a better understanding of my invention reference may now be had to the accompanying drawings of which

In refrigerators and cold storage rooms of retail stores, meat shops, oyster houses and the like, ice has been commonly employed, heretofore, as the cooling agent, or means for reducing and maintaining a comparatively low temperature therein. But ice as a cooling agent is unsatisfactory for various reasons. It is costly, troublesome, inefficient and unsanitary, and is also objectionable because of the large space and equipment necessary for its utilization. It is almost impossible to regulate the temperature of an enclosed space that is cooled by means of natural or artificial ice. Moreover, in extremely hot weather, it is not an infrequent occurrence for all the ice in the ice receptacle to melt before it can be replenished, thus causing deterioration and loss of articles, that have been placed within the cooled or refrigerated space.

In refrigerating cabinets or rooms, it has been found to be less expensive and more satisfactory in every way to install machinery to mechanically maintain those cabinets or rooms at the required low temperature. But, heretofore, such machinery has been too expensive in its original cost, and in its cost of installation and operation, to be employed in other than large rooms or spaces. Moreover, replacements and repairs in and for such devices require the presence and services of an expert.

These and other disadvantages are overcome by the device herein disclosed, which consists of a comparatively small portable unitary refrigerating unit that may be installed by any ordinary workman and when installed will automatically maintain the cooling room or enclosure at a predetermined low temperature without the services of an operator or attendant.

Referring more particularly to Figures 1 to 7, inclusive, the reference character A designates a cooling unit which consists of a refrigerant system B a motor 1 and attendant valves and control mechanism. The refrigerant system B consists essentially of the compressor 2, condenser 3, and vaporizer 4. Any suitable refrigerant may be employed in said system, such as sulphur dioxide ($SO_2$).

Figure 1:
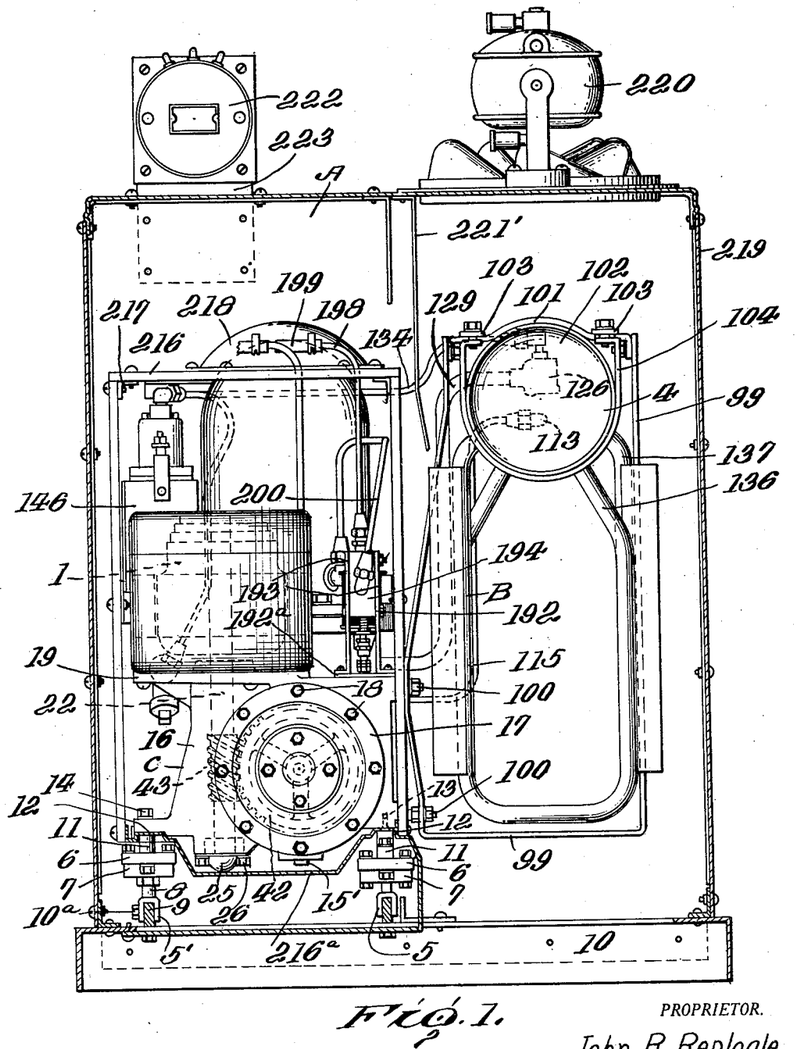
Figure 1 is a front elevational view of a mechanical refrigerating apparatus constructed in accordance with my invention and disposed within an enclosing casing, portions of which are broken away for the sake of clearness.
Figure 2:
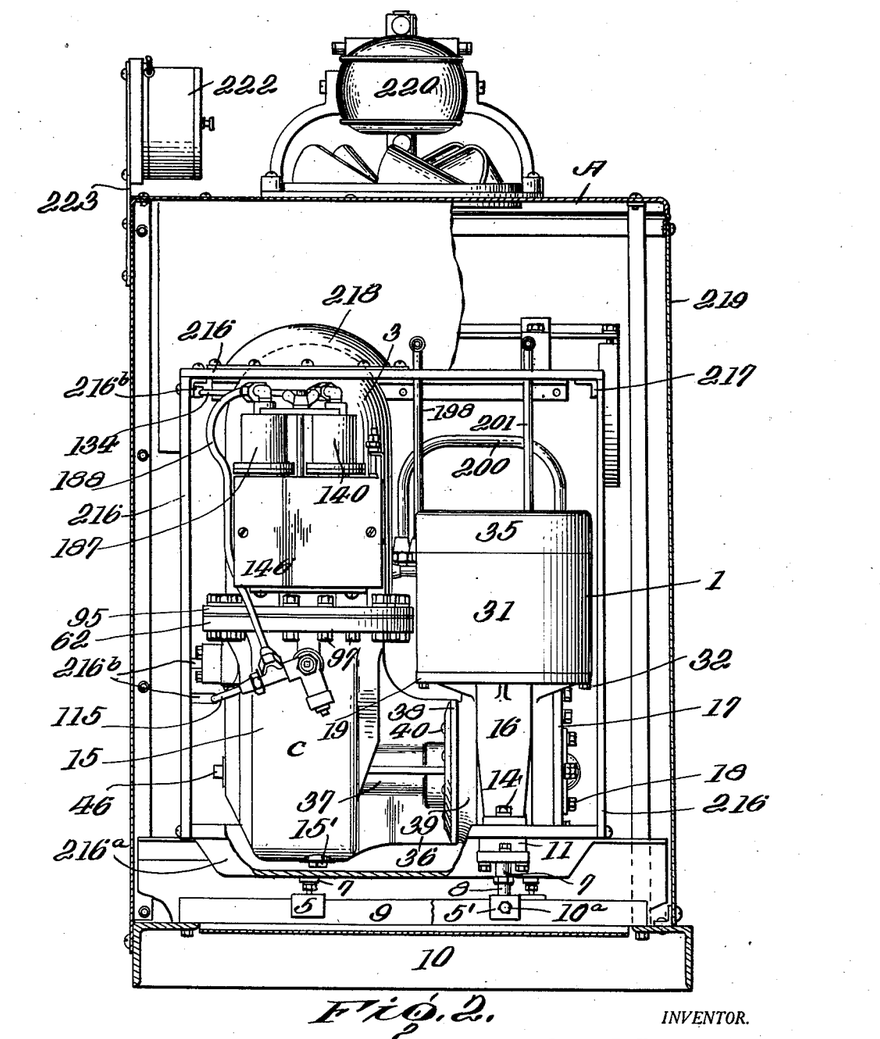
Figure 2 is a side elevational view of the structure illustrated in Figure 1, with portions of the enclosing casing broken away.
Figure 3:
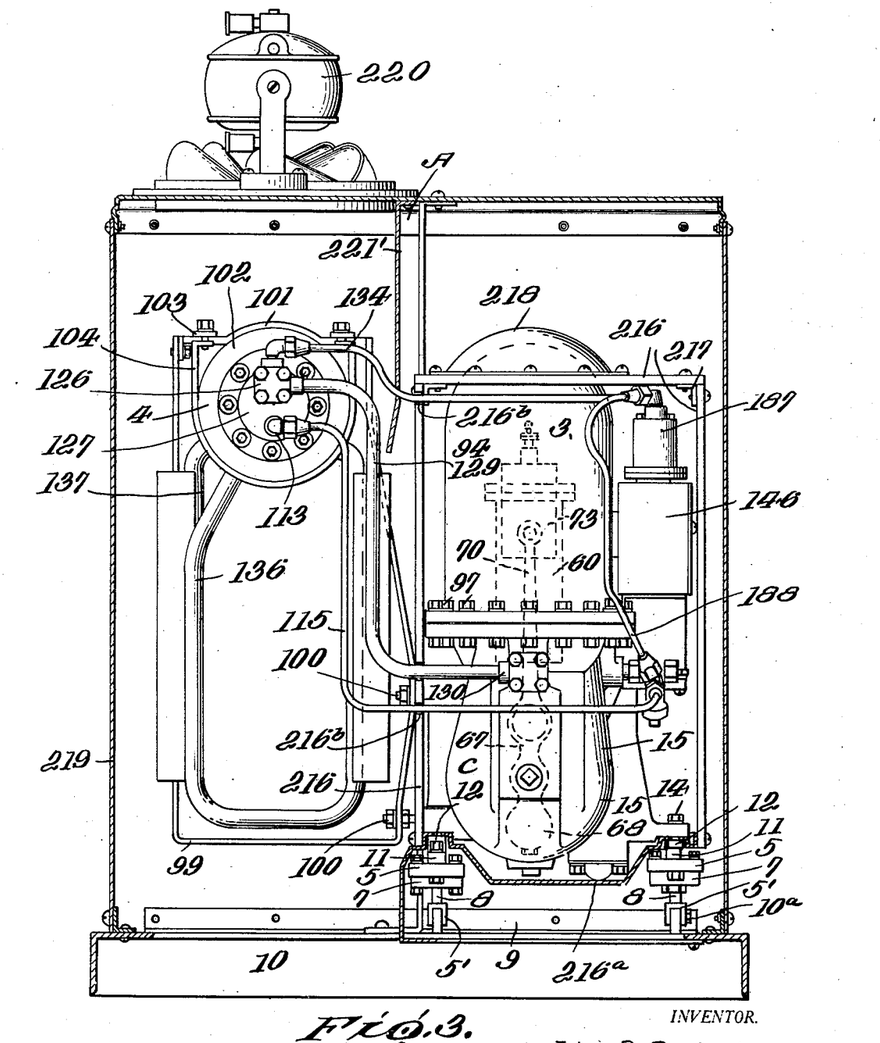
Figure 3 is a rear elevational view of the structure illustrated in Figure 1, portions thereof being again broken away for the sake of clearness.
Figure 4:
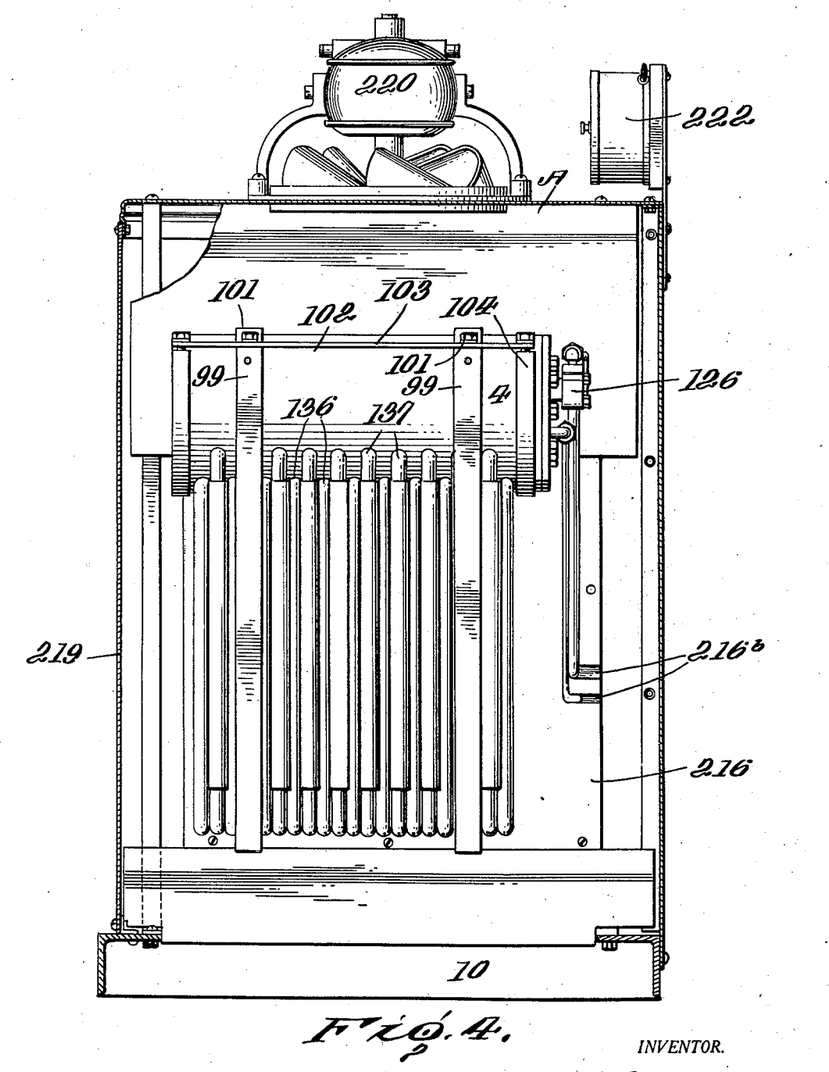
Figure 4 is a side elevational view of the structure illustrated in Figure 1, with portions broken away, the view being of the side opposite to that illustrated in Figure 2.

The base of the device is in the form of a housing C. The housing is provided with any suitable form of supports. In order, however, to reduce noise and vibration the housing is provided with flexible supports. As shown in Figures 1 to 5, there are two non-adjustable supports 5 on one side and an adjustable support 5' on the other. Each of these supports consists of a flexible member 6 to which a bottom cross-bar 7 is bolted. The cross-bar 7 is provided with a downwardly extending centrally arranged member 8 the lower end of which is bifurcated to engage a bar 9 secured edgewise to a suitable supporting frame 10. An upper cross-bar 11 arranged at right angles to the lower cross bar 7 is also bolted to the flexible member. The upper cross bar 11 is provided with an upwardly extending centrally arranged extension 12 which is reduced and screw-threaded to engage in a tapped hole in the housing, as shown at 13 at the right in Figure 1, or extends through an aperture in an extension on the housing C and is provided with a securing nut 14 as shown at the left of said figure. The member 8 on the left support, Figure 1, is screwed into the cross member 7 and affords a means for raising and lowering the corresponding side of the housing to properly level the device. A lock nut holds the member 8 in adjusted position. This arrangement affords a convenient means for moving the unit on to the supporting frame 10 since the device may be slid along and withdrawn from or placed in position thereon with facility. A set screw 10a secures the supports in adjusted position.

The housing C consists of the crank case 15 and the gear case 16. The gear case 16 (see Fig. 5) has an enlarged opening in the front thereof for the insertion and removal of the gears. This opening is closed by the cover plate 17 secured in position by means of the bolts 18 engaging in tapped holes in the said gear case. The upper portion of the gear case 16 is provided at one side thereof with an annular flange 19 extending about an opening in which is mounted an anti-friction bearing 21 for the worm shaft 22. The lower end of the shaft 22 is provided with a step bearing 23 mounted in the lower end 24 of the casing 16. A cover plate 25 secured in position by means of the bolts 26 closes the lower end of the opening 24.

The motor 1 is of the universal type having a vertical armature shaft 27. The shaft 27 is in the form of a sleeve and is removably mounted on the upwardly extended portion of the worm shaft 22. The two shafts are secured together by means of slots 28 in the lower end of the sleeve or armature shaft 27 engaging the projecting ends of a pin 29 extending transversely through the shaft 22. A cap 20 held against the ends of the shafts 22 and 27 by a screw 30 secures the armature of the motor 1 in operative position. A motor frame 31, containing the usual field windings, is secured to the flange 19 by means of bolts 32. The upper open end of the motor frame 31 is closed by means of a removable cap, or cover 35. It will thus be seen that by removing the cap or cover 35 and the bolts 30 and 32 the motor may be removed. An oil deflector or slinger 33 mounted on the lower end of the hollow shaft 27 co-operates with a flange 34 of the member 19 to prevent oil from passing upward along the worm shaft 22 into the motor and its windings.

The crank case 15 is adapted to contain a suitable supply of oil for the lubrication of the compressor and for sealing the valves. The crank case 15 is provided with an opening in its lower end for the discharge of the oil from the case. This opening is closed by a plug 15' (see Fig. 5). In the operation of the compressor, the oil is splashed on the various journals and within the cylinder and some of it is scrubbed past the piston into the condenser where it is absorbed or dissolved in the refrigerant and carried therewith into the vaporizer.

The casing 15 is provided with a laterally extending web 36 which is provided with a drive shaft housing 37 terminating in an attaching flange 38. The flange 38 is counterbored to receive the apertured annular extension 39 on the casing or housing 16. The parts, and consequently the crank and gear cases 15 and 16 are secured together by means of the bolts 40.

Figure 5:
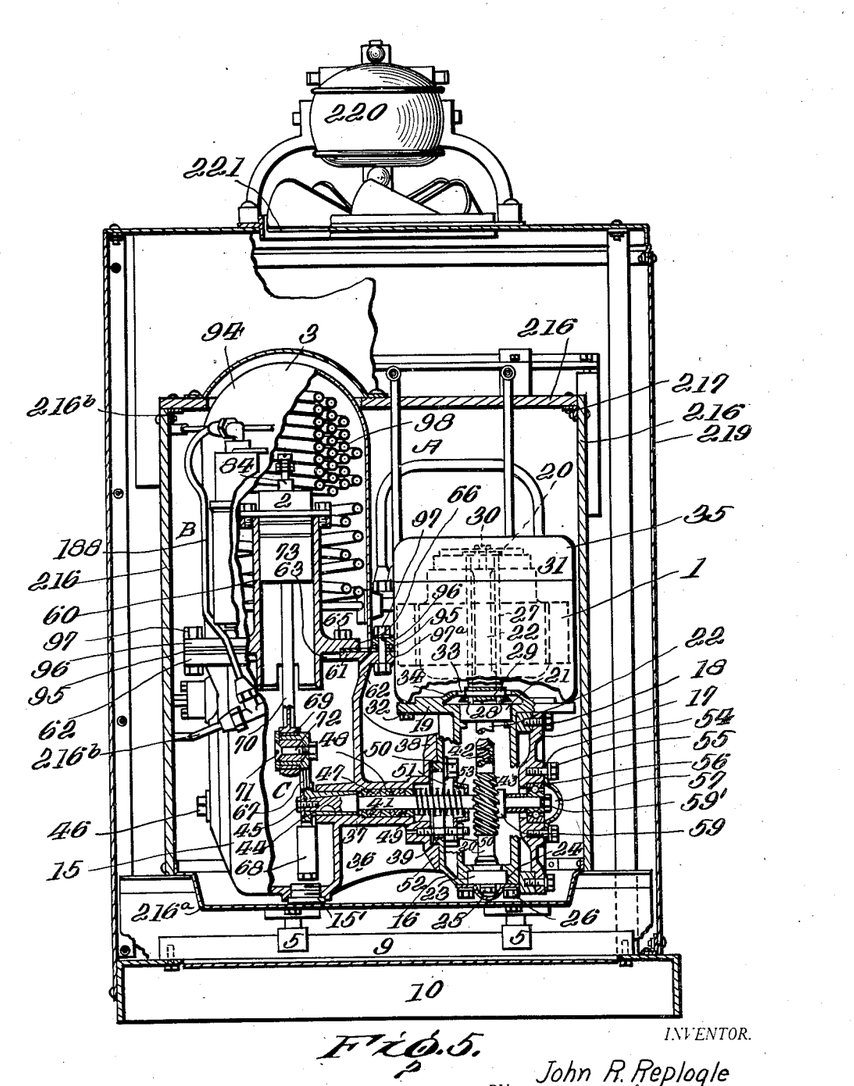
Figure 5 is a view, somewhat similar to Figure 2, with portions thereof in section and portions in elevation.

Extending through the drive shaft housing 37 is the drive shaft 41 on which is mounted the gear wheel 42 which is driven by the worm 43 on the shaft 22, shown in Figure 5 with parts broken away to expose the gear wheel 42. The rear end of the shaft 41 is provided with a bearing 44 which is keyed thereto and secured in position thereon by means of the screw 45, access to which may be had through an oil receiving opening in the rear of the crank case 15, which is closed by a screw-threaded plug 46. The crank case may be supplied with oil through this opening. Suitable packing 47 is provided for preventing the oil and refrigerant from passing along the shaft 41 into the gear case. The packing is provided with the usual glands 48 against one of which a spring 49 engages. The tension of the spring 49 is regulated by means of nuts 50 on studs 52 which engage a spring retaining member 51.

The member 51 is provided with a depression 53 for engaging the front end of the spring. The front end of the shaft 41 extends into an opening 54 in the cover plate 17. The opening 54 is counter-bored to provide a shoulder 55 against which the outer race of a bearing 56 is held by means of a cover plate 57 which closes the opening 54 and is held in position by any suitable means, as the screws 58. The inner race of the bearing 56 is clamped between a sleeve 59 and a nut 59' on the forward end of the shaft.

From the foregoing description, it will be apparent that by first removing the cap 57, the nut 59' and the cap plate 17, the gear wheel 42 may be removed from the shaft 41 by means of a suitable tool.

The compressor 2 may consist of any suitable form and number of cylinders but as shown it is provided with a single cylinder and piston. The cylinder 60 is shown as forming a closure for the upper open end of the casing 15. The upper edge of this casing is provided with annular internal and external flanges 61 and 62, respectively. The cylinder 60 of the compressor 2 is provided on its lower end with an annular flange 63 which rests on and is secured to the flange 61 by suitable fastening means, as the bolts 65, one of which is shown in Figure 5. A suitable gasket 66 may be interposed between the flanges 61 and 63.

The rear end of the shaft 41 is provided with a crank arm 67 which may be secured thereto in any suitable manner. As shown, the arm 67 is integral with the bearing 44. A counter-weight 68 is secured in like manner to the opposite side of the shaft. The arm 67 is provided with a bearing 69. The lower end of a piston rod 70 is journaled on the bearing 69 between a flange on the bearing and a flange carried by the retaining plug 71 secured in the recessed end of the bearing by means of the bolt 72.

The cylinder 60 is provided with a piston 73 to which the upper end of the piston rod 70 is pivoted in any suitable manner. A suitable valve in the piston 73 permits gas to pass therethrough from the crank case into the cylinder from which it passes into a condenser 3 through a suitable discharge valve 84.

Mounted over and about the compressor 2 is the condenser 3. It consists of a condenser dome 94 and a coil 98. The condenser dome 94 is provided on its lower edge with an outwardly extending flange 95 which rests on the flange 62 on the casing 15 and is clamped between it and a ring 96 by means of the bolts 97. A gasket 97a may be employed to seal the joints. This dome may be made of any suitable material. Formerly, such devices were cast, but in such structures, leaks often develop which are extremely difficult to remedy. I have found that the dome, if drawn from sheet metal, as copper, is comparatively free from such defects and is easily soldered if a leak should develop.

The condenser coil 98 is located within the dome 94 above and about the cylinder 60 which extends upwardly within the dome. Water flowing through the condenser coil 98 will condense the vaporous refrigerant pumped or forced into the condenser dome by the compresser 2.

The evaporator or vaporizer 4 is supported by any suitable means such as the U-shaped supports 99 which are detachably mounted on the cases 15 and 16 by means of the bolts 100. The ends of the supports extend upwardly and are detachably secured to the downwardly extending ends of saddles 101 which engage the upper surface of the header or vaporized chamber 102. Bars 103 are supported on the saddles 101 at each side of the chamber 102. Secured to the bars 103 at each end thereof are loops 104 which engage beneath the chamber 102 at each end thereof to support the same.

The vaporizer 4 includes the vaporizer chamber 102, an expansion valve 113, a float (not shown) for controlling the same, and an outlet 126 in an end plate or cap 127. The chamber may also have associated with it expansion or vaporizer coils 136 and 137, if desired. A conduit 115 serves to connect the high pressure side of the compressor to evaporator chamber 102 through the expansion valve 113. The block 127 is provided with a laterally extending aperture 128 in communication with the outlet 126. A conduit 129 communicating with the outlet 126 at its upper end has its lower end in communication with a port 130 in the casing 15. The compressor draws the vaporous refrigerant into the casing 15 from the chamber 102 through this conduit 129 when the device is in operation. A conduit 134 has one end secured in the outlet 126 in the plate 127 and has its other end connected to the controller or switch control mechanism 135.

The motor for operating the device is started and stopped automatically by suitable controlling mechanism. The controlling mechanism for this purpose is pressure operated. It is the usual practice in pressure controllers to employ a fluid thermostat for automatically starting and stopping the motor. I have found, however, that the employment of a thermostat for this purpose is unnecessary because by placing the controller in direct communication with the expansion chamber, the operations of the motor may be as efficiently controlled without a fluid thermostat as with one. In the present invention a switch 146 controlling mechanism for starting and stopping the motor is operated directly by the pressure in the expansion chamber by means of suitable bellows (not shown) and since the pressure in the expansion chamber increases as the internal temperature increases and vice versa it follows that the operation of the motor is controlled by the internal temperature as described in my co-pending application, Serial No. 475,344.

Any suitable controller or switch controller mechanism may be employed. The one shown consists of a rigid cylinder 140 enclosing an expansible bellows (not shown) which operates an electrical switch, enclosed within the switch box 146, which controls the operation of the motor 1 in accordance with the variations in pressure within the evaporator 4. The conduit 134 is connected to the top of the cylinder 140.

It sometimes happens in mechanical refrigerators of the compression type that the pressure in the condenser becomes excessive, as for instance, when the supply of cooling medium is stopped for any reason. It is necessary to provide means for stopping the motor under such conditions. Any suitable mechanism which will operate the motor controlling switch when the pressure in the condenser becomes excessive may be employed. For this purpose a cylinder 187 which encloses a pressure actuated bellows, is employed, which has attached thereto a conduit 188, which is in communication with the high pressure side of the condenser. As shown, the conduit 188 is in communication with the conduit 115. The collapsible bellows (not shown) within the cylinder 187 is adapted to operate the motor controlling switch when excessive pressure is built up in the condenser.

In refrigerators of the compression type, it is sometimes desirable to employ a cooling fluid, usually water, to absorb and conduct away the heat of the compressed refrigerant vapor in order to condense the same. In automatically operated refrigerators a valve for admitting the water to the condensing coil is opened and closed by a device that is usually automatically operated by the pressure created when the compressor is operated. With such a control, however, in order that the water valve may be opened only during the operating of the motor, the minimum pressure at which the control must be set to open the valve is that corresponding to the highest temperature of the room during the hottest season of the year. Consequently, the compressor must always operate against this high pressure which very materially decreases its efficiency and increases its cost of operation.

In order to overcome the necessity of the compressor operating against this excessive pressure, I have provided mechanism for operating the water valve simultaneously with the starting and stopping of the motor. By such an arrangement, the pressure in the condenser is never much above that corresponding to the temperature of the cooling fluid which, under ordinary working conditions, is very much less than in the former system. In other words, the compressor will operate at a pressure which, while varying with the temperature of the cooling fluid, will always be materially less than under the pressure control system. This mechanism indicated at 192, consists of a base plate 192a, which is adapted to be secured to the top of the casing 16 as shown in Fig. 1. Two spaced metallic supporting strips 193 are mounted on the base plate 192a and extend upwardly therefrom. A magnetically actuated water valve is enclosed by a valve housing 194, which is clamped between the upper ends of the supporting plates 193. A water conduit 198 has one end connected in the housing 194, and has its other end connected to the flexible connections 199 (see Figs. 1 and 2) which, in turn, is detachably connected to a suitable water supply pipe. The housing 194 has a lateral passage in which is connected one end of the pipe 200, the other end of which is connected to one end of the condensing coil 98. The other end of the condensing coil is connected to the pipe 201 which is in communication with the sewer.

In order to prevent the noise made by the operating parts of the refrigerator from being heard and to prevent undue heat transfer, the operating parts, that is the motor, compressor, controls and valve operating mechanisms are isolated from the vaporizer by means of a housing 216, Figs. 1 to 5. This housing may be made of any suitable material, preferably of insulating material, and the walls are connected together in any suitable manner as by means of the brackets 217. The bottom wall of this housing is formed from sheet metal bent to proper form to constitute an oil receptacle or pan 216a (see Fig. 3). In order to conserve material, the top wall of the housing may be provided with an aperture through which the upper portion of the dome may extend. This aperture is closed by a plate 218.

From the foregoing description it will be apparent that refrigerant, in the form of gas is taken from the crank case 15 through the piston 73 and is compressed thereby in the cylinder 60. The compressed gas passes out of the cylinder 60 through the valve 84 into the condenser dome 94 where it is condensed. In the form of liquid the refrigerant passes out of the dome 84 through the conduit 115 into the evaporator chamber 102. From the chamber 102 the refrigerant returns in the form of gas through the conduit 129 to the crank case 15. By means of a conduit 134 the chamber 102 is connected to the cylinder 140, and the condenser is connected to the cylinder 187 by means of the conduit 188, whereby control of the motor is effected. The conduits 115, 129 and 134 pass through slots 216b in the edge of the heat insulating wall 216 disposed between the cooling unit and the compressor condenser unit.

Figure 6:
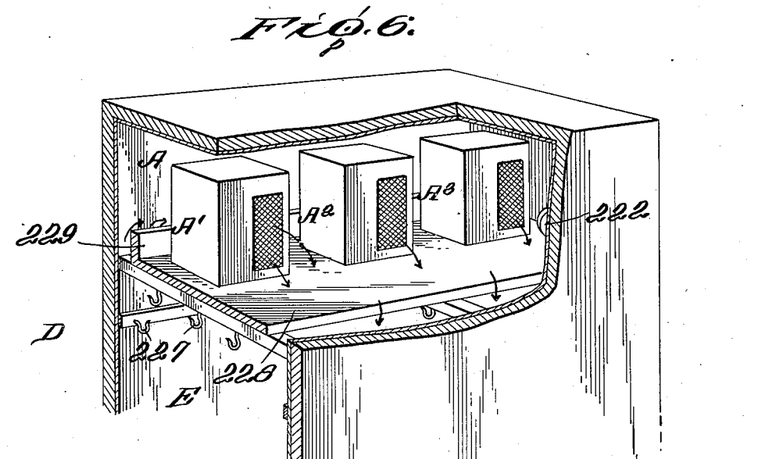
Figure 6 is a perspective view, partially in section, of a conventional cooling room as employed in retail shops or stores, with a plurality of cooling units located therein.
Figure 7:
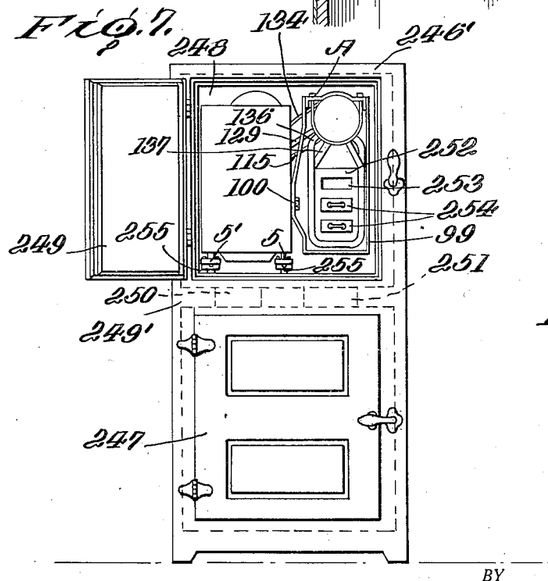
Figure 7 is a view, in front elevation, of a household refrigerator with a refrigerating unit constructed in accordance with my invention disposed therein.

The refrigerating unit may, if desired, be enclosed in a sheet metal casing 219, as shown in Figs. 1 to 6 inclusive, or, this casing may be omitted, as shown in Fig. 7. This casing may be made and put together in any suitable manner as by means of bolts so that one or more side walls may be readily removed to have access to the device. The casing may be bolted to the supporting frame 10. The bottom of this casing directly beneath the vaporizer is left open when the parts are assembled, the whole device being portable. It will also be appreciated that the cooling unit may be readily removed from the casing 219 when necessary or desirable.

In order that the atmosphere in all parts of the refrigerated space shall be maintained at a uniform constant temperature, when my apparatus is employed to cool the air of a large room, a fan for agitating and circulating the air is provided. This fan is so arranged that it directs the air across the vaporizer whereby the air is cooled. It is not necessary, however, that the fan be run continuously in order to maintain the room at a predetermined temperature. A thermostat is provided for automatically starting and stopping the fan in order to maintain the room at the required temperature.

As shown in Fig. 1, the electric fan 220 is mounted on the casing 219 directly above the opening 221 (see Fig. 5) in the top wall of the casing 219 in any suitable manner. A deflector 221', Fig. 1, directs the air across the vaporizer.

Thermally operated means are employed to control the operation of the fan. As shown, a thermostat 222 is mounted in any convenient manner, either on the casing 219 or at any convenient point within the enclosure in which the unit is employed. As shown in Fig. 1, a plate 223 is attached to one side wall of the casing and extends above the same to which is attached the thermostat. The thermostat is arranged to open and close the switch for operating the electric fan. The thermostat may be adjusted in the usual manner to operate at any desirable predetermined temperatures. Since the details of the thermostat constitute no part of my invention, those details are not herein described.

The air within the cooling enclosure is usually maintained at a temperature above the freezing point of water, consequently when the temperature of the vaporizer is lowered, as when the motor has been operating for a short time, the air circulating about the vaporizer will become chilled below the saturation point and will deposit moisture on the vaporizer, which, due to the low temperature of the same, will freeze thereon. In other words, the vaporizer will become frosted. When, however, the temperature of the vaporizer rises the warmer air circulating about the vaporizer will defrost the same i. e. will melt the ice thereon. The operation of the fan when the temperature of the vaporizer is nearing its maximum greatly accelerates the defrosting action. The water formed by the melting ice may be collected in a pan or receptacle from which it may be conducted to the sewer if it is desirable to maintain the air in the enclosure dry. If, however, it is desirable that a normal amount of moisture be maintained in the air to prevent the drying out of the certain foods, such as meats and the like, the water is left in the receptacle to be reabsorbed by the air, which is readily accomplished, especially where the receptacle is located in the current of air created by the fan.

In Figure 6 is shown a usual or conventional cooling room as employed in stores, shops and the like. The cooling room D is provided with a lower compartment E in which meat or other articles may be placed or suspended from the hooks 227, and an upper compartment F in which the ice is placed. The upper compartment is provided with a floor 228 which is narrower than the width of the room and is so located that there is a ventilating space between each side wall and the floor. A narrow vertical wall 229 rises from one edge of the floor and when ice is employed causes the natural circulation of air across the ice in the direction of the arrows, warmer air ascending on that side and the cooler air descending on the other.

In the application of my invention to the conventional ice refrigerator described above, in order to conserve space in the lower compartment, one or more cooling units may be placed in the ice compartment. As shown on the drawings, three units $A^1$, $A^2$, $A^3$, are employed. They may be set on the floor 228 and are arranged with the fans adjacent to the wall 229 so that the circulation of the air will be in the same direction as when ice is employed. A single thermostat 222 for controlling the fans is secured to the cooling room wall in such a position that it is directly in front of one of the fans whereby it is more readily affected by the lowered temperature of the air forced across the vaporizer.

In Fig. 7 is shown an adaptation of my invention to a household refrigerator, to which my present invention is directed. The refrigerator cabinet 246' may be of any construction, for example, consisting of a lower food compartment 247 and an upper compartment 248. The door 249 of the upper compartment is shown as being open in order to show the cooling unit located therein. The partition wall 249' between the two compartments is provided with two ventilating openings 250 and 251 for the natural circulation of the air within said refrigerator.

The opening 251 is located directly beneath the vaporizer. It will be noted that no fan is employed, the natural circulation of the air being quite sufficient.

A metallic supporting member 252 is secured within the loops of the expansion coils 136 and 137 and is provided with openings 253 for the reception of trays 254. One of the openings 253 with the tray removed is shown on the drawings. These trays are adapted to contain water or other articles that are to be chilled or frozen.

It has been found that with this arrangement of the vaporizer and its expansion coils, water or other substances in the trays may be frozen without the necessity of employing a liquid heat conveying medium such as brine, in connection with the vaporizer or its expansion coils.

The bifurcated flexible supports 5 and 5' are adapted to engage guides 255, similar to the guides 9, secured within the upper compartment.

The form of the device employed for various installations will depend on various conditions and circumstances so that the form of the device best suited for use in any particular enclosure will be used therein. The controlling factors are the size and shape of the enclosure and the nature or character of the work to be done. For instance, where the device is employed in a cooling room designed for ice, the form of the device shown in Fig. 6 may be employed, and where the device is employed in a domestic refrigerator, the form shown in Fig. 7 may be employed, without making any change whatever in the room or refrigerator, except to provide water and electrical connections. It is only necessary to place the cooling unit on the floor of the ice compartment and make the necessary electrical and water connections.

Figure 8:
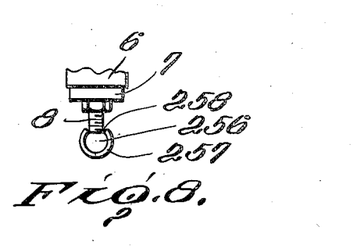
Figure 8 is a detail view of a modified form of cooling unit supporting device.

In Fig. 8 is shown a modified form of support for the cooling unit and a guide therefor.

The lower ends of the supports, one only of which is shown in Fig. 8, are provided with balls 256 which are adapted to engage in tubes 257 having slots 258 on their upper sides to permit the sliding of the supports along said guides.

It should be noted that the entire cooling unit, including the motor, compressor, condenser, evaporator and control unit may be assembled in exterior to the casing 219 or the domestic refrigerator, as the case may be, and inserted in the casing 219 or refrigerator cabinet 246' in assembled form by properly mounting the supporting devices 5 and 5' upon the rails 9 or 255 and sliding the complete unit horizontally into position, after which the screws 10ª are tightened to prevent subsequent movement. All refrigerant conduits and electrical connections interconnecting the various individual units are installed before inserting the assembled unit into the refrigerator cabinet or casing, so that it is only necessary to place the assembled unit in the desired location and make the necessary electrical and water connections. In like manner the assembled unit may be removed from the refrigerator or casing by disconnecting the flexible water connections 199 and the electrical connections, loosening the set screws 10ª and pulling the assembled unit horizontally along the supporting rails until the unit is out of the enclosure.

Also, it will be apparent that the cooling unit may be removed from the remainder of the apparatus by removing the bolts 100 and disconnecting the refrigerant conduits 115, 129 and 134.

This invention is not limited in its application to the particular construction or constructions herein illustrated, as various changes might be made in the construction or constructions shown without departing from the spirit of this invention as set forth in the appended claims.

I claim:

1. In air cooling apparatus, the combination of means comprising a refrigerant vaporizer for absorbing heat from the air to be cooled; a refrigerant compressor; a condenser; said compressor, condenser and vaporizer being operatively connected to form a closed refrigerant system; a motor for driving the compressor; means directly responsive to the temperature of the said heat-absorbing means for controlling the operation of the compressor motor; means comprising a fan for directing the air to be cooled over the said heat-absorbing means; a motor for driving said fan; and means responsive to the temperature of the air to be cooled for controlling the operation of the fan motor.

2. An air cooling apparatus constituting a self-contained unit and having in combination means comprising a refrigerant vaporizer for absorbing heat from the air to be cooled; a refrigerant compressor; a condenser; said compressor, condenser and vaporizer being operatively connected to form a closed refrigerant system; a motor for driving the compressor; means directly responsive to the temperature of the said heat-absorbing means for controlling the operation of the compressor motor; a casing around said heat-absorbing means; a fan for causing flow of the air to be cooled through said casing; a motor for driving said fan; and means responsive to the temperature of the air to be cooled for controlling the operation of the fan motor.

3. In refrigeration apparatus, the combination of a unitary structure adopted to be located in an enclosed space; said unitary structure comprising a motor driven compressor-condenser unit; a housing therefor; a base to which the housing is attached; a vaporizer supported at the side of the said housing; a casing attached to the said base and enclosing the said housing and vaporizer and having inlet and outlet openings therein for the circulation of air; and automatically controlled means carried by the said casing for forcing a circulation of air though the casing and over the vaporizer.

4. In refrigeration apparatus, a motor-driven compressor-condenser unit; a housing therefor; a vaporizer supported at the side of the said housing; a casing enclosing the said unit and the vaporizer, and having an opening therein adjacent the vaporizer to be used as an outlet for cool air; a fan associated with said casing for forcing air over the vaporizer and out the said opening in the casing; and means responsive to the temperature of a space to be cooled for controlling the operation of the said fan.

5. In refrigeration apparatus, a motor driven compressor-condenser unit; a housing therefor; a vaporizer supported at the side of the said housing; an enclosing casing for the said vaporizer and the said housing; a fan associated with the said casing; and means located in the said casing for guiding the air from the said fan so that it will pass over the said vaporizer and be cooled thereby.

6. In refrigeration apparatus, a casing; a housing located in the said casing; a motor-compressor-condenser unit in said housing; a vaporizer supported at one side of the said housing; a guiding plate supported by one wall of the said casing and extending parallel to and towards the surface of the said housing nearest the vaporizer; the last named surface, the guiding plate and parts of the said casing forming a chamber for enclosing the said vaporizer; and means carried by the said casing for forcing air over the said vaporizer.

7. In refrigeration apparatus, a motor driven compressor-condenser unit; a vaporizer supported by said motor-compressor-condenser unit and comprising a header, tubes extending therefrom, and heat conducting fins attached to the tubes; a casing enclosing the entire apparatus and having inlet and outlet openings therein for the passage of air, and means associated with the said casing for circulating air through the casing and over the said tubes and fins.

8. In refrigeration apparatus, a motor driven compressor-condenser unit; a vaporizer supported by said compressor-condenser unit and comprising a header, tubes extending therefrom, and heat conducting fins attached to the tubes; a casing enclosing the entire apparatus and having inlet and outlet openings therein for the passage of air; means associated with the said casing for circulating air through the casing and over the said tubes and fins; and means outside of the said casing for controlling the operation of the said air forcing means in response to temperature changes in the surrounding space to be cooled.

9. In a refrigerating apparatus, a heat transfer structure comprising a housing provided with an air inlet opening in one side and an outlet opening in the opposite side, a vaporizer secured within said housing intermediate of said intake and outlet openings and including a plurality of spaced pipe loops and fins thermally associated therewith, and a fan for circulating air through said housing and into contact with the said pipe loops and fins.

10. In a refrigerating apparatus, a heat transfer structure, a housing provided with an inlet opening in one side and an outlet opening in the opposite side, a vaporizer secured within said housing and including a plurality of spaced pipe loops and fins in thermal contact with said loops, a fan supported by the housing adjacent said inlet opening for providing a forced circulation of air through said housing and causing the air to contact with said pipe loops.

In testimony whereof I hereunto affix my signature.

JOHN R. REPLOGLE.